(12) United States Patent
Farmer et al.

(10) Patent No.: US 12,676,311 B2
(45) Date of Patent: *Jul. 7, 2026

(54) ELECTRODE ASSEMBLIES INCORPORATING ION EXCHANGE MATERIALS

(71) Applicant: Zelos Energy Ltd., San Leandro, CA (US)

(72) Inventors: Joseph Collin Farmer, Tracy, CA (US); Pavel Khokhlov, San Ramon, CA (US); Alexander Gorer, San Ramon, CA (US)

(73) Assignee: Zelos Energy Ltd., San Leandro, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/039,730

(22) Filed: Sep. 30, 2020

(65) Prior Publication Data

US 2021/0104746 A1 Apr. 8, 2021

Related U.S. Application Data

(60) Provisional application No. 62/910,952, filed on Oct. 4, 2019.

(51) Int. Cl.
 *H01M 4/62* (2006.01)
 *H01M 4/04* (2006.01)
 (Continued)

(52) U.S. Cl.
 CPC ........... *H01M 4/62* (2013.01); *H01M 4/0435* (2013.01); *H01M 4/244* (2013.01); *H01M 4/30* (2013.01);
 (Continued)

(58) Field of Classification Search
 CPC . H01M 4/24; H01M 4/244; H01M 2300/0014
 See application file for complete search history.

(56) References Cited

U.S. PATENT DOCUMENTS

| | | | |
|---|---|---|---|
| 3,384,482 A | 5/1968 | Kelly et al. | |
| 4,018,971 A | 4/1977 | Sheibley et al. | |
| (Continued) | | | |

FOREIGN PATENT DOCUMENTS

CA 2932016 C 6/2019

OTHER PUBLICATIONS

Stock et al., "Towards zinc-oxygen batteries with enhanced cycling stability: The benefit of anion-exchange ionomer for zinc sponge anodes", Journal of Power Sources, vol. 395, Jun. 15, 2018, p. 195-204.

(Continued)

*Primary Examiner* — James Lee
(74) *Attorney, Agent, or Firm* — Polygon IP, LLP

(57) ABSTRACT

A rechargeable battery cell includes an electrode and an ion exchange material arranged to define an interpenetrating interface with at least a portion of the electrode. Providing an interpenetration interface in intimate contact can include completely or partially embedding the electrode in the ion exchange material, or alternatively, surrounding the electrode or discrete portions of the electrode with a thin film of ion exchange material. In one embodiment, electrodes can be particles fully or partially embedded, coated with, or partially contacting ion exchange material.

27 Claims, 5 Drawing Sheets

(51) Int. Cl.
    *H01M 4/24*           (2006.01)
    *H01M 4/30*           (2006.01)
    *H01M 10/30*         (2006.01)
    *H01M 4/02*           (2006.01)

(52) U.S. Cl.
    CPC ...... *H01M 10/30* (2013.01); *H01M 2004/021*
      (2013.01); *H01M 2004/027* (2013.01); *H01M*
                      *2300/0014* (2013.01)

(56) References Cited

U.S. PATENT DOCUMENTS

| | | | |
|---|---|---|---|
| 5,019,235 | A | 5/1991 | Nyberg et al. |
| 5,635,041 | A | 6/1997 | Bahar et al. |
| 6,174,623 | B1 | 1/2001 | Shackle |
| 6,638,659 | B1 | 10/2003 | Fenton et al. |
| 7,087,348 | B2 | 8/2006 | Holman et al. |
| 7,560,191 | B2 | 7/2009 | Ryu et al. |
| 7,700,226 | B2 | 4/2010 | Yong et al. |
| 8,003,258 | B2 | 8/2011 | Issaev et al. |
| 8,518,253 | B2 | 8/2013 | Xiong et al. |
| 9,118,089 | B2 | 8/2015 | Friesen et al. |
| 9,365,688 | B2 | 6/2016 | Elabd et al. |
| 9,728,792 | B2 | 8/2017 | Lee et al. |
| 10,044,016 | B2 | 8/2018 | Kakeya et al. |
| 10,147,974 | B2 | 12/2018 | Masel et al. |
| 10,221,485 | B2 | 3/2019 | Upadhyaya et al. |
| 10,312,542 | B2 | 6/2019 | Jang et al. |
| 2003/0068549 | A1* | 4/2003 | Daniel-Ivad ........... H01M 4/50 |
| | | | 429/212 |
| 2006/0005663 | A1* | 1/2006 | Fan ....................... H01M 4/244 |
| | | | 75/343 |
| 2006/0257744 | A1 | 11/2006 | Bruchardt |
| 2008/0096061 | A1 | 4/2008 | Burchardt |
| 2009/0090636 | A1* | 4/2009 | Feng ....................... C25D 5/34 |
| | | | 205/300 |
| 2009/0173582 | A1* | 7/2009 | Ogg ....................... H01M 4/043 |
| | | | 429/161 |
| 2011/0027666 | A1 | 2/2011 | Burchardt et al. |
| 2015/0155559 | A1* | 6/2015 | Zimmerman ......... H01M 4/625 |
| | | | 429/224 |
| 2017/0012313 | A1 | 1/2017 | Inoue et al. |
| 2018/0102567 | A1 | 4/2018 | Fujinoki et al. |
| 2019/0044129 | A1* | 2/2019 | Yadav .................. H01M 4/043 |
| 2022/0052365 | A1* | 2/2022 | Wang .................. H01M 8/083 |

OTHER PUBLICATIONS

Fukuta, "Electrolyte Materials for AMFCs and AMFC Performance" [slide deck], May 8, 2011.
Wikipedia, "Potassium hydroxide", Sep. 23, 2019.

\* cited by examiner

200

204

206

202

210

214

216

212

220

224

226

222

300

500

ELECTRODE ASSEMBLIES INCORPORATING ION EXCHANGE MATERIALS

RELATED APPLICATIONS

This application claims the benefit of U.S. Provisional Application Ser. No. 62/910,952, filed Oct. 4, 2019, which is hereby incorporated herein by reference in its entirety for all purposes.

TECHNICAL FIELD

The present disclosure relates generally to the field of batteries and components for batteries. More specifically, the present application relates to batteries or cells that include an ion exchange material.

BACKGROUND

There is a great demand for low-cost rechargeable battery systems with a high energy density for portable devices, electric vehicles, grid storage, and other applications. Recently, lithium ion batteries have become a popular technology of choice for many energy storage applications. Unfortunately, the limited availability of key metals, high energy costs, and safety risks associated with Li-ion technology limit the wide adoption of the batteries in many applications.

As an alternative, Zn-based batteries with aqueous electrolytes have been used. The lower cost and relative safety of such batteries allow them to be used in many potential applications.

SUMMARY

In one embodiment, a rechargeable battery cell includes an electrode and an ion exchange material arranged to define an interpenetrating interface with at least a portion of the electrode. Providing an interpenetration interface in intimate contact can include completely or partially embedding the electrode in the ion exchange material, or alternatively, surrounding the electrode or discrete portions of the electrode with a thin film of ion exchange material. In one embodiment, electrodes can be particles fully or partially embedded, coated with, or partially contacting ion exchange material. In another embodiment, electrode particles can be mixed or otherwise intermingled with ion exchange material.

In some embodiments the electrode can include a zinc (Zn) containing anode. In other embodiments the electrode is a cathode including at least one of nickel hydroxide (Ni (OH)$_2$), nickel oxyhydroxide (NiOOH), manganese dioxide (MnO$_2$), ferrate salts (Fe(VI)) , manganate salts (Mn (VI)), permanganate salts (Mn (VII)).

The electrode can at least partially include electrode particles sized to be less than 300 microns and packed to have a pore volume less than 50% of total electrode volume.

In some embodiments the ion exchange material can include either an anion exchange material or a cation exchange material. The ion exchange material can include a polymeric material having attached charged functional groups.

In some embodiments, ion transport can be enabled by a liquid alkaline electrolyte contacting the electrodes. Optionally, the electrolyte can have at least some incorporated ion exchange material.

In one embodiment, the rechargeable battery cell can include an electrode that includes a plurality of particles and an ion exchange material contacting and surrounding at least a portion of particles of the electrode.

In one embodiment, the rechargeable battery cell can include an electrode comprising a plurality of particles an ion exchange material contacting and completely surrounding a surface of each of the plurality of particles.

In one embodiment, the rechargeable battery cell can include an electrode comprising a plurality of particles and an ion exchange material arranged to embed substantially all of the plurality of particles of the electrode.

In one embodiment, a method of manufacturing a rechargeable battery cell can include forming a plurality of particles into an electrode and embedding or mixing an ion exchange material into at least some of the plurality of particles of the electrode. Embedding can involve at least one of melting, softening, depositing from a melt or solution, laminating, and pressure application.

In some embodiments, manufacture can involve soaking the electrode in a liquid electrolyte.

In some embodiments, manufacture can involve assembling the electrode and the ion exchange material into a battery prior to embedding or mixing the ion exchange material into at least some of the plurality of particles.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

The present disclosure relates in part to battery cells having improved cycle life and electrical performance in service. For example, the cells can exhibit higher battery discharge voltage, higher discharge capacity, lower internal resistance, and high-rate discharge capability. In some embodiments, the disclosed battery cells have a long cycle lifetime at high-rate discharge current.

Figure 1:
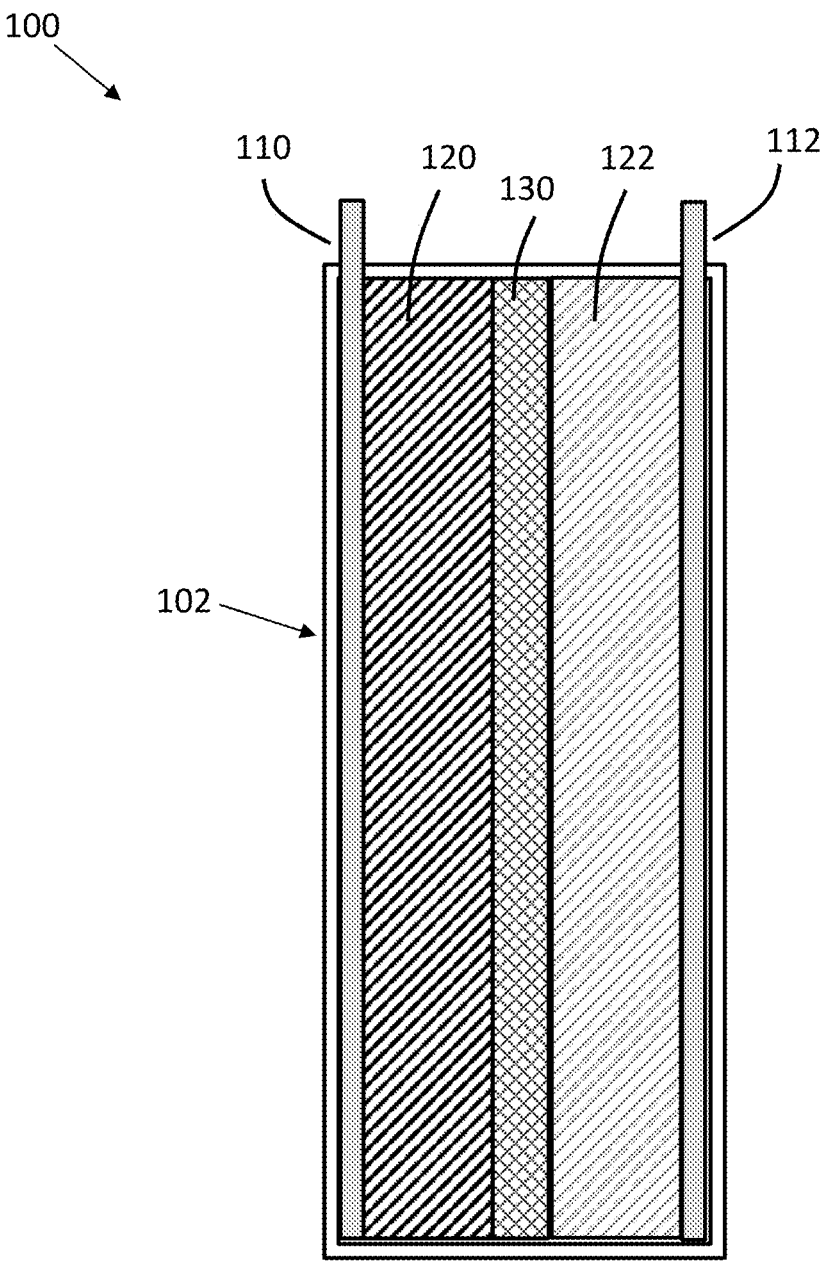
FIG. 1 illustrates a battery containing ion exchange material in contact with electrode material.

FIG. 1 illustrates a rechargeable battery cell system 100 that includes a casing 102 that surrounds various battery components. Battery components can include current collectors 110 and 112 that facilitate charge and discharge of the battery cell system 100. Other components include electrode material 120 and 122 that respectively contact current collectors 110 and 112. The electrode material 120 and 122 are separated from each other by a separator 130 that only permits ion flow between the material. The rechargeable battery cell system 100 can include anode, cathode, ion exchange material, and other materials and components as described in the following:

Electrodes

Electrode material can include material formed as thin films, or structured patterns such as columns, needles, groove, or slots. In some embodiments electrodes can be loosely arranged materials, rigidly bound or sintered structures, or solid continuous pore structures. In one embodiment, electrodes can be formed from particles provided in various forms such as powders, granules, pellets, or nanomaterial. In certain embodiments, particles can have an average size (diameter or longest dimension) of between about 0.1 μm to 300 μm, and in a specific embodiment, between about 100 μm and 1 μm. In some embodiments, relatively homogeneous particle sizes can be used, while in other embodiments heterogenous sized materials can be used. Particles can be processed to increase effective surface area. In some embodiments, particles can be processed by heating, melting, fusing, or sintering to bind together the particles. In other embodiments, additional binders can be used to hold particles together.

Collectors

At least a portion of electrode material is placed in contact with a current collector. The current collector serves to supply an electric current so that it can be consumed for the electrode reaction during charge and collect an electric current generated during discharge. The current collector is typically formed from a material which has a high electrical conductivity and is inactive to electrochemical battery cell reaction. The current collector may be shaped in a plate form, foil form, mesh form, porous form-like sponge, punched or slotted metal form, or expanded metal form.

The material of the current collector can include Ni, Ti, Cu, Al, Pt, V, Au, Zn, and alloys of two or more of these metals, such as stainless steel. Other embodiments can be graphite cloth, copper sheet, or mesh slotted woven brass.

Anode Material

Anode materials for an electrode can include a wide range of elements such as zinc, aluminum, magnesium, iron, lithium, and other metals in pure oxide form or salt form, or combinations thereof. In some embodiments, relatively pure Zn, ZnO, or a mixture of Zn and ZnO can be used. For a rechargeable zinc negative electrode, the electrochemically active material is the zinc oxide powder or a mixture of zinc and zinc oxide powder. The zinc oxide can dissolve in an alkaline electrolyte to form the zincate $(Zn(OH)_4^{2-})$. Zinc oxide and/or zincate are reduced to zinc metal during the charging process.

More broadly, anode materials can include:

Any metal M, metal oxide MOx or metal salt having a redox potential E0 lower than the redox potential of the cathode material.

Any metal oxide MOx having a redox potential E0 lower than the redox potential of the cathode material.

Any alloy of any metals MM1M2 . . . Mn, mixed oxides or mixed salts having a E0 lower than the E0 of the cathode material.

Any polymer that can accommodate anions in its structure having a redox potential E0 lower than the redox potential of the cathode material.

Any mixture of one or more of the above mentioned type of materials.

Cathode Material

Cathode material for an electrode can include a wide range of materials such as metal or metal containing compounds such as ferrate salts (Fe(VI)), permanganate salts (Mn (VII)), nickel hydroxide $Ni(OH)_2$, nickel oxyhydroxide NiOOH, manganese dioxide $MnO_2$ or any combinations.

More broadly, cathode materials can include:

Any metal M having a redox potential E0 larger than the redox potential of the anode material.

Any metal oxide MOx having a redox potential E0 larger than the redox potential of the anode material.

Any alloy of any metals MM1M2 . . . Mn having a E0 larger than the E0 of the anode material.

Any metal fluoride MFn having a redox potential larger than the anode material.

Any alloy MM1M2 . . . MnOxFm with n larger than or equal to 2 and m being larger or equal to zero.

Any polymer that can accommodate anions in its structure having a redox potential E0 larger than the redox potential of the anode material.

CFx carbon fluoride with x being between zero and 2.

Salts are not stable in aqueous electrolyte solutions, including but not limited to FeVI (iron six) based battery systems.

Any mixture of one or more of the above mentioned type of materials.

In some embodiments, wherein the cathode can include one or more additives selected from the group consisting of Bi, Cu, Sn, Pb, Ag, Co, Ni, Mg, K, Li, Al, Ca, Fe, Zn, V, Ba, Y, Ti, Sr, wherein the additive is in oxide or hydroxide form.

Additives and Binding Agents

Various additives can be used to improve electrochemical, electrical, or mechanical features of the electrodes. For example, electrochemical performance can be improved by addition of nickel, nickel hydroxide, nickel oxyhydroxide, or nickel oxide containing cathode material that can incorporate or be coated with small amounts of cobalt oxide, strontium hydroxide (Sr(OH)2), barium oxide (BaO), calcium hydroxide (Ca(OH)2), Fe3O4, calcium fluoride (CaF2), or yttrium oxide (Y2O3) to improve battery cell performance. As another example, electrode can include an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 10% by weight of a dry negative electrode formulation. Indium oxide may be present in a concentration of between about 0.05 and 1% by weight of a dry negative electrode formulation. Aluminum oxide may be provided in a concentration of between about 1 and 5% by weight of a dry negative electrode formulation.

In certain embodiments, one or more additives may be included to improve corrosion resistance of the zinc electrode material. Specific examples of anions that may be included to reduce the solubility of zinc in the electrolyte include phosphate, fluoride, borate, zincate, silicate, oxalate or stearate. Generally, these anions may be present in an electrode in concentrations of up to about 10% by weight of a dry electrode formulation.

Additives that improve electrical characteristics such as conductivity can also be added. For example, a range of carbonaceous materials can be used as electrode additives, including powdery or fibrous carbons such as graphite, coke, ketjen black, and acetylene black. Carbonaceous nanomaterials can also be used such as single or multiwalled carbon nanotubes, carbon nanofibers, multi-layered carbon nanoparticles, carbon nanowhiskers, or carbon nanorods.

Additives may be provided as chemically homogeneous components into a mixture or solution, co-precipitated, or coated onto particles.

Mechanical properties can be improved in one embodiment by addition of binding agents to provide increased electrode mechanical strength, and flexure or crack reduction for the electrode. Binding agents may include, for example, polymeric materials such as polytetrafluoroethylene (PTFE), polyethylene (PE), polypropylene (PP), polyisobutylene (PM), polyvinyl alcohol (PVA), polyacrylic acid, polyvinyl acetate, carboxy methyl cellulose (CMC), styrene butadiene rubber (SBR), polyethylene oxide (PEO) polybutylene terephthalate (PBT) or polyamides, polyvinylidene fluoride (PVDF), silicone-based elastomers such as polydimethyl siloxane (PDMS) or rubber materials such as natural rubber (NR), ethylene propylene rubber (EPM) or ethylene propylene diene monomer rubber (EPDM).

Ion Exchange Material

The ion exchange material is generally selective for the transport of either cations or anions. An anion selective ion exchange material can be used alone, a cation selective ion exchange material can be used alone, or they can be used in combination with each other. In one embodiment the ion exchange material can be an organic or polymeric material having attached strongly acidic groups, such as sulfonic acid including, sodium polystyrene sulfonate, or polyAMPS. Alternatively, the ion exchange material can be an organic or polymeric material having attached strongly basic groups, such as quaternary amino groups including trimethylammonium groups (e.g. polyAPTAC). In another embodiment, the ion exchange material can be an organic or polymeric material having attached weakly acidic groups, including carboxylic acid groups. Alternatively, the ion exchange material can be an organic or polymeric material having attached weakly basic groups, typically featuring primary, secondary, and/or tertiary amino groups (e.g. polyethylene amine).

The ion exchange material can be provided to interact with electrode material as a fully or partially embedding polymer, a particle mixture, a membrane or film, particulates or beads, or a coating. The anode alone, the cathode alone, or both the anode or cathode can be configured to interact with an ion exchange material, which can be the same or different material for the respective electrodes.

Electrolyte

An electrolyte is used to maintain high ionic conductivity between electrodes and inside electrode pores. Electrolytes can be aqueous based, solvent based, solid polymer, or an ionic liquid. In some embodiments, electrolytes can be semi-solid or gelatinized. Gelatinizing agents can include polymers that absorb the liquid of the electrolyte solution and swell. Such polymers can include polyethylene oxide, polyvinyl alcohol, and polyacrylamide.

In another embodiment, the electrolyte can be a solid state electrolyte. In another embodiment, the electrolyte can be formed as a solid material with absorbed water. For example, KOH is exposed to humid air.

In another embodiment electrolytes can be formed from ion exchange material such as explained above under "Ion exchange material" section.

In one embodiment aqueous alkaline electrolytes can be used. Alkaline electrolytes can include alkalis such as potassium hydroxide, sodium hydroxide, lithium hydroxide, calcium hydroxide or inorganic salts such as zinc bromide.

Separator

A separator may be replaced with (or used in conjunction with) an ion exchange membrane or film. A conventional porous polymer separator or ion exchange separator may be provided as a polymer membrane or film. Typically, a separator is disposed between the anode and the cathode, and acts to prevent the anode and the cathode from having internal electrical shorts. In addition, the separator can also act to retain the electrolyte, particularly for battery systems that use different cathode and anode electrolyte solutions.

The separator is generally required to have a porous structure or a structure having a number of perforations capable of allowing ions to pass while being chemically stable with respect to the electrolyte solution. In some embodiments, one or more separators can be formed by coating electrodes or particles that collectively form an electrode. The separator can be formed from a nonwoven fabric or a membrane having a micropore structure made of glass, polypropylene, polyethylene, resin, or polyamide. Alternatively, the separator may be constituted by a metal oxide film or a resin film combined with a metal oxide respectively having a plurality of perforations.

Processing

In one embodiment, a dry mixing process can be performed in which various anode and cathode materials, as well as additives and binders are mixed while dry. Optional processing steps such as heating, fusing, compressing, and melting ion exchange material can be performed before placing the mixture in a battery casing. In other embodiments, optional processing steps such as heating, fusing, compressing, and melting ion exchange material can be performed after placing the mixture in a battery casing. A liquid electrolyte can be added before sealing the battery casing.

According to other embodiments, a wet mixing process may instead be utilized. In a wet mixing process, one or more solvents are added at the beginning or during the mixing process, or, alternatively, one or more ingredients may be used in the form of a dispersion or suspension. The solvent(s) can be subsequently removed after the mixing process or later state in the production process.

In other embodiments, the various individual components may be made using different methods. For example, some of the electrodes may be produced using a dry mixing process, while portions of the electrode may be produced using a wet process. According to yet another embodiment, it is possible to combine both dry and wet processes for the different components.

Battery and Cell Design

The battery cells can have any of a number of different shapes and sizes. For example, coin, prismatic, pouch or cylindrical cells can be used. Cylindrical cells may have the diameter and length of conventional 18650, 26650, AAA cells, AA cells, A cells, C, or D cells or others. Custom cell designs can be used in some applications. For example, prismatic cell designs can be used for portable or vehicular applications, as well as various larger format cells employed for various non-portable applications. A battery pack can be specifically designed for particular tools or applications. Battery packs can include one or more battery cells and appropriate casing, contacts, and conductive lines to permit reliable charge and discharge in an electric device.

Figure 2A:
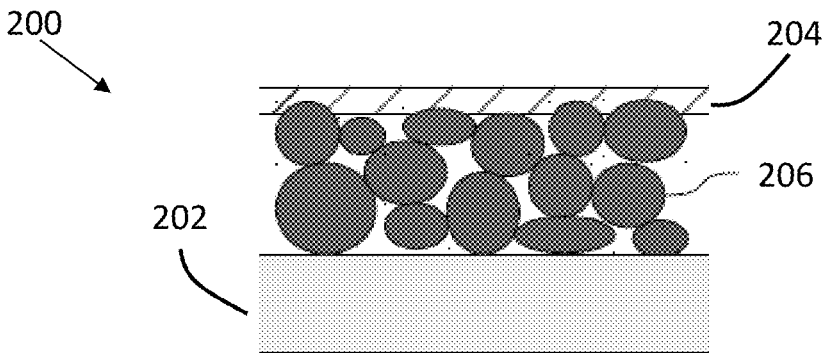
FIGS. 2A-C illustrate various forms of contact between electrode particles and ionic exchange material.
Figure 2B:
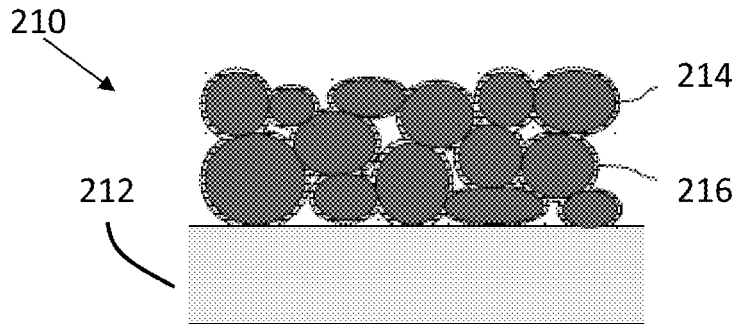
Figure 2C:
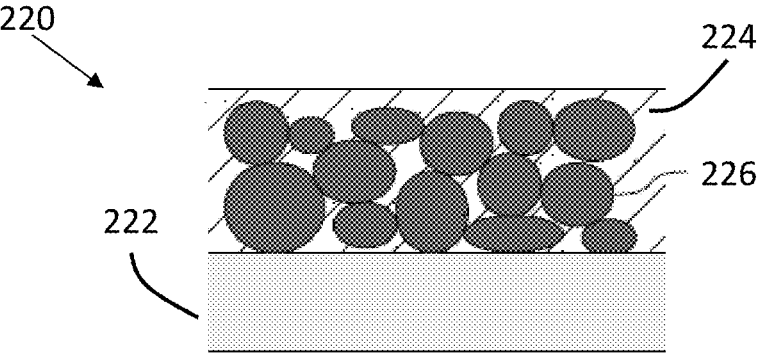

FIGS. 2A-C illustrate a portion of rechargeable battery cells 200, 210, and 220 that include an electrode and an ion exchange material arranged to define an interpenetrating interface with at least a portion of the electrode. Providing an interpenetration interface in intimate contact can include completely or partially embedding the electrode in the ion exchange material, or alternatively, surrounding the electrode or discrete portions of the electrode with a thin film of ion exchange material. In one embodiment, electrodes can be particles fully or partially embedded, coated with, or partially contacting ion exchange material.

FIG. 2A illustrates a rechargeable battery cell 200 including a collector 202 contacting at least some of a plurality of electrochemically active particles 206. Another set of particles 206 also contact and are partially embedded in an ion exchange membrane 204. This ion exchange membrane can be positioned by partially melting, fusing, laminating, or pressure attachment to the particles 206. An electrolyte (not shown) can also be provided to fill in particle pore spaces and contact ion exchange membrane 204.

FIG. 2B illustrates a rechargeable battery cell 210 including a collector 212. Each of the particles 216 is in contact and is surrounded by an ion exchange material 214. This ion exchange membrane can be positioned by coating attachment to the particles 216 prior to incorporation of the particles into the rechargeable battery cell. An electrolyte (not shown) can also be provided to fill in particle pore spaces and contact ion exchange material 214.

FIG. 2C illustrates a rechargeable battery cell 220 including a collector 222 contacting at least some of a plurality of electrochemically active particles 226. Another set of particles 226 also contact and are fully embedded in an ion exchange material 224. This ion exchange material can be positioned by melting or fusing attachment to the particles 226. An electrolyte (not shown) can also be provided contact ion exchange material 224.

EXAMPLE 1

The example describes the fabrication of a ZnO-based anode for an alkaline rechargeable battery with an anion exchange membrane embedded into the electrode on the surface by lamination. The following paste composition was used for the anode preparation: ZnO (94 w. %), carbon nanotubes (1 w. %), PTFE (5 w. %). This composition was used to prepare a viscous paste having 27 w. % of water. The paste was spread to form a ~0.6 mm thick uniform film. The film was applied to a brass wire cloth current collector. The anode film applied to the current collector was dried in a vacuum at 70° C. overnight and then compressed using a calender roller press. After that, 37 mm×25 mm electrodes were cut out of the film on the current collector, and a nickel strip tab was attached to the electrodes. The electrode was laminated with an anion exchange membrane on both sides using the SKY-325R6 lamination machine at 140 ° C., using speed setting 2.

EXAMPLE 2

The example describes the fabrication of a rechargeable alkaline nickel-zinc cell having a ZnO-based anode with an anion exchange membrane embedded into the electrode on the surface. The anode for the cell was prepared as described in Example 1 above. A commercial sintered nickel electrode was used as a cathode. The cathode size was 40 mm×27 mm, and the capacity was 27 mAh/cm². Nickel strip was welded to each cathode to form electrode tabs. Each cathode was sealed in a paper separator. The anode was sandwiched between the cathodes on both sides, forming an electrode stack. The electrode stack was placed inside a polypropylene pouch with an attached pressure relief valve so that electrode tabs were sticking out of the pouch. 2 ml of electrolyte (20% KOH in water) was added to the cell. After that, the cell was sealed using a heat sealer.

Figure 3:
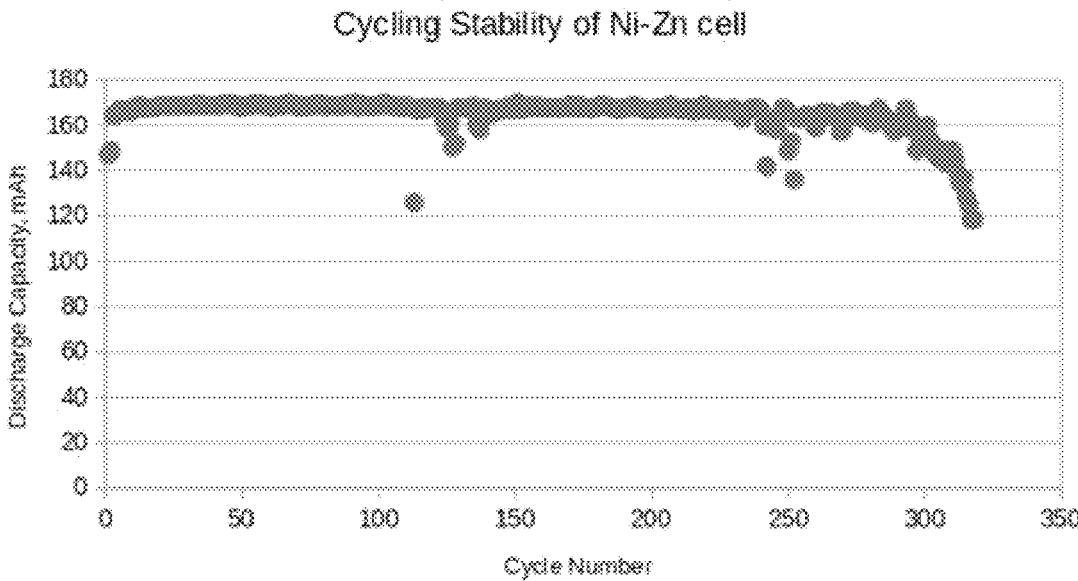
FIG. 3 is a graph illustrating discharge capacity for a Ni—Zn cell as a function of cycle number

The cell was left soaking for 4 hours and then charged and subsequently subjected to charge-discharge cycling with the following test protocol: constant current charge at 162 mA up to 1.95V followed by constant voltage charge to 173 mAh total capacity; constant current discharge to 1.2V or 173 mAh. The test was carried out at room temperature. Discharge capacity for the Ni-Zn cell as a function of cycle number is illustrated in FIG. 3 as graph 300.

EXAMPLE 3

The example describes the fabrication of a Zn metal-based anode for an alkaline rechargeable battery with an anion exchange membrane embedded into the electrode on the surface by lamination. The following paste composition was used for the anode preparation: Zn (79 w. %), ZnO (14.5%), $Bi_2O_3$ (0.5%), PTFE (5.8 w.%), CMC (0.2%). This composition was used to prepare a viscous paste having 12 w. % of water. The paste was spread to form a ~0.6 mm thick uniform film. The film was applied to a brass wire cloth current collector. The anode film applied to the current collector was dried in a vacuum at 70° C. overnight and then compressed using a calender roller press. After that, 37 mm×25 mm electrodes were cut out of the film on the current collector, and a nickel strip tab was attached to the electrodes. The electrode was laminated with an anion exchange membrane on both sides using the SKY-325R6 lamination machine at 140° C., using speed setting 2.

A cross-section sample was prepared from the formed anode using the pot and polish technique. Cross-section SEM images and results of EDX analysis are shown in the FIGS. 4-5.

Figure 4:
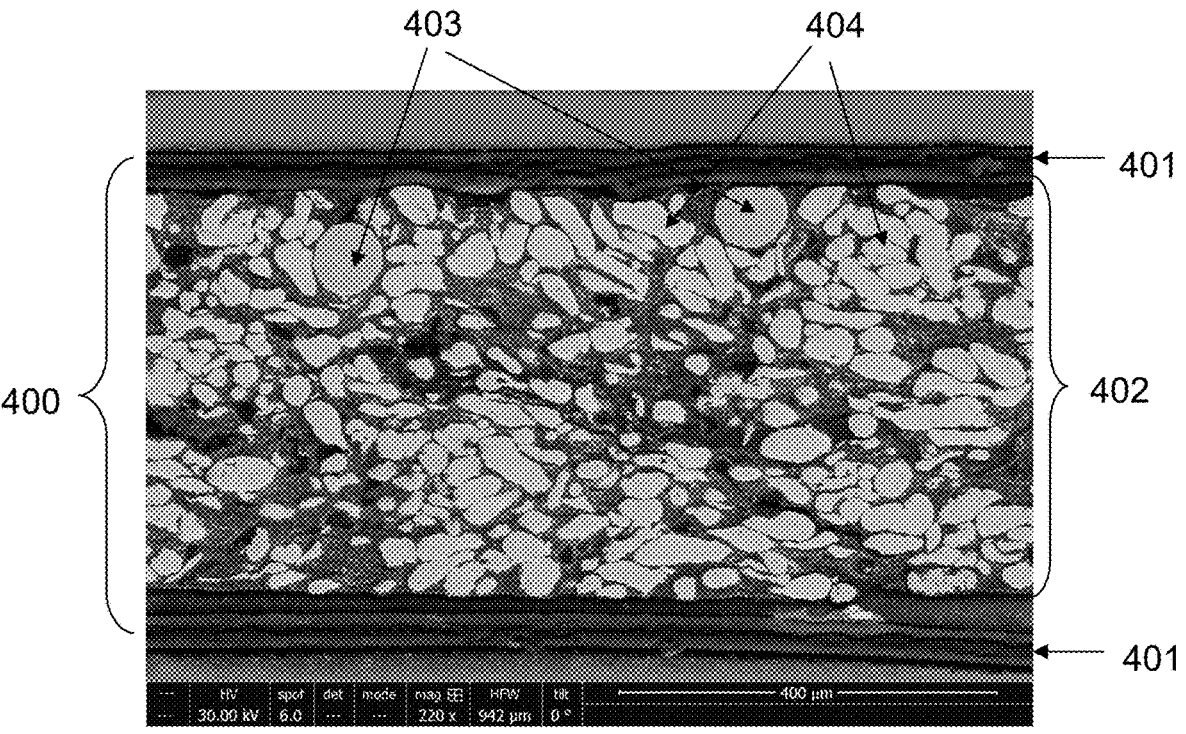
FIG. 4 shows a cross-sectional SEM image of a Zn electrode laminated on both sides with an anion exchange membrane.

FIG. 4 shows a cross-sectional SEM image of a Zn electrode laminated on both sides with an anion exchange membrane. An anode 400 including an anion exchange membrane 401 is laminated on both sides of the electrochemically active layer 402 with embedded brass mesh current collector 403. The electrochemically active layer consists of Zn metal particles 404 mixed with ZnO, $Bi_2O_3$ as additives, and PTFE as a binder.

Figure 5:
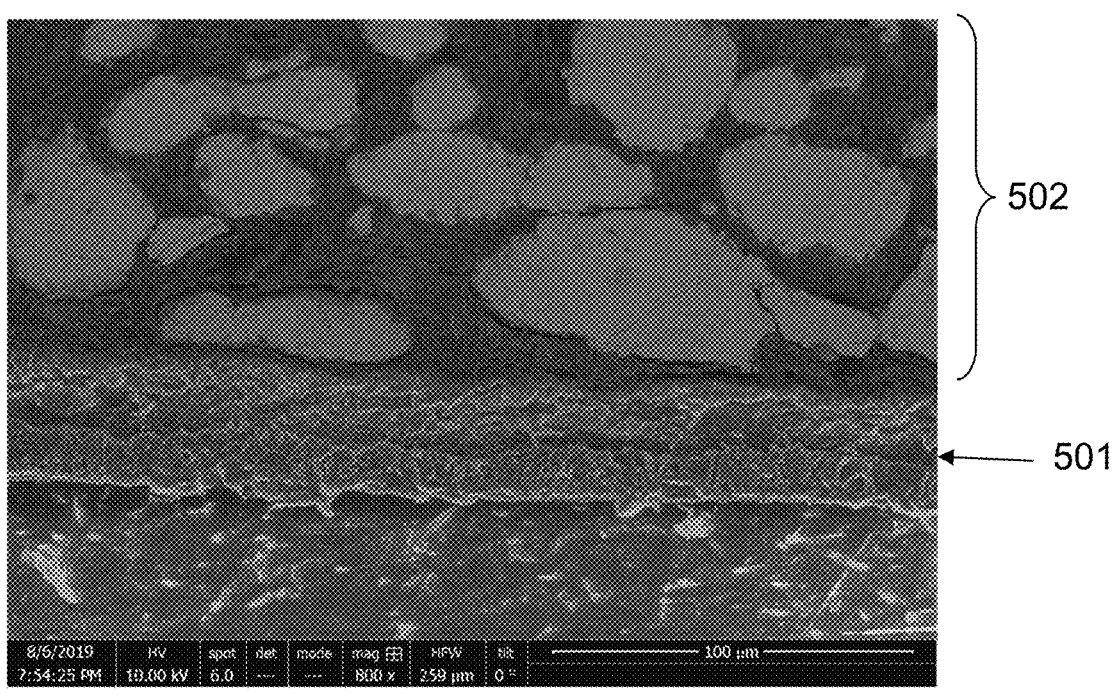
FIG. 5 shows a more detailed SEM image of a Zn electrode laminated on both sides with an anion exchange membrane.

FIG. 5 shows an SEM image 500 of a Zn electrode laminated on both sides with an anion exchange membrane (cross-section). The image shows a close-up view of an intimate contact between membrane anion exchange material 501 (corresponding to anion exchange membrane 401 of FIG. 4) and electrode electrochemically active mass 502 (corresponding to electrochemically active layer 402 of FIG. 4).

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A rechargeable battery cell comprising:

an anode comprising a plurality of particles comprising zinc (Zn);

an ion exchange material in a form of a layer arranged to define an interpenetrating interface with at least a portion of the anode, thereby at least partially embedding the anode in the ion exchange material, wherein:

the interpenetrating interface is formed by one or more of melting, fusing, laminating, or pressure attachment of the ion exchange material, in the form of the layer, with the anode, the ion exchange material comprises a polymeric material and one or more groups, attached to the polymeric material, and selected from the group consisting of a sulfonic acid, a quaternary amino group, a carboxylic acid group, a primary amino group, a secondary amino group, and a tertiary amino group, and the ion exchange material, in the form of the layer, contacts at least a portion of the plurality of particles of the anode;

a cathode, wherein the ion exchange material is positioned and provides ionic conductivity between the anode and the cathode; and a liquid alkaline electrolyte contacting the anode and the cathode and providing ionic conductivity between the anode and the cathode.

2. The rechargeable battery cell of claim 1, wherein the cathode comprises one or more materials selected from the group consisting of nickel hydroxide (Ni $(OH)_2$), nickel oxyhydroxide (NiOOH), manganese dioxide ($MnO_2$), a ferrate salt (Fe(VI)), a manganate salt (Mn (VI)), and a permanganate salt (Mn (VII)).

3. The rechargeable battery cell of claim 1, wherein:

the cathode comprises one or more additives selected from the group consisting of Bi, Cu, Sn, Pb, Ag, Co, Ni, Mg, K, Li, Al, Ca, Fe, Zn, V, Ba, Y, Ti, and Sr, and the one or more additives are in an oxide form or a hydroxide form.

4. The rechargeable battery cell of claim 1, wherein the plurality of particles has a particle size of than 300 microns and is packed to have a pore volume less than 50% of a total volume of the anode.

5. The rechargeable battery cell of claim 1, wherein the ion exchange material is an anion-selective exchange material.

6. The rechargeable battery cell of claim 1, wherein the liquid alkaline electrolyte comprises one or more materials selected from the group consisting of KOH, NaOH, and LiOH.

7. The rechargeable battery cell of claim 1, wherein the ion exchange material completely surrounds a surface of each of the plurality of particles.

8. The rechargeable battery cell of claim 1, wherein the plurality of particles of the anode are intermixed with the ion exchange material.

9. The rechargeable battery cell of claim 1, wherein the anode comprises metal zinc prior to initial cycling.

10. The rechargeable battery cell of claim 1, wherein the anode comprises metal zinc oxide prior to initial cycling.

11. The rechargeable battery cell of claim 1, wherein the cathode comprises nickel hydroxide (Ni $(OH)_2$).

12. The rechargeable battery cell of claim 1, wherein the cathode comprises nickel oxyhydroxide (NiOOH).

13. The rechargeable battery cell of claim 1, wherein the cathode comprises manganese dioxide ($MnO_2$).

14. The rechargeable battery cell of claim 1, wherein the cathode comprises a ferrate salt (Fe(VI)).

15. The rechargeable battery cell of claim 1, wherein the cathode comprises a manganate salt.

16. The rechargeable battery cell of claim 1, wherein the cathode comprises a permanganate salt (Mn (VII)).

17. The rechargeable battery cell of claim 1, wherein the liquid alkaline electrolyte further comprises a gelatinizing agent selected from the group consisting of polyethylene oxide, polyvinyl alcohol, and polyacrylamide.

18. The rechargeable battery cell of claim 1, wherein the anode further comprises one or more additives selected from the group consisting of bismuth oxide, indium oxide, and aluminum oxide.

19. The rechargeable battery cell of claim 18, wherein the one or more additives comprise indium oxide with a concentration of 0.05-1% weight in the anode.

20. The rechargeable battery cell of claim 18, wherein the one or more additives comprise aluminum oxide with a concentration of 1-5% weight in the anode.

21. The rechargeable battery cell of claim 1, wherein the anode further comprises one or more corrosion-resistance additives selected from the group consisting of phosphate anions, fluoride anions, borate anions, zincate anions, silicate anions, oxalate anions, and stearate anions.

22. The rechargeable battery cell of claim 21, wherein the one or more corrosion-resistance additives have a concentration of up to 10% weight in the anode.

23. The rechargeable battery cell of claim 1, wherein the anode further comprises one or more conductive additives selected from the group consisting of graphite, coke, ketjen black, acetylene black, single carbon nanotubes, multiwalled carbon nanotubes, carbon nanofibers, multi-layered carbon nanoparticles, carbon nanowhiskers, and carbon nanorods.

24. The rechargeable battery cell of claim 1, wherein the anode further comprises one or more binding agents selected from the group consisting of polytetrafluoroethylene (PTFE), polyethylene (PE), polypropylene (PP), polyisobutylene (PIB), polyvinyl alcohol (PVA), polyacrylic acid, polyvinyl acetate, carboxy methyl cellulose (CMC), styrene butadiene rubber (SBR), polyethylene oxide (PEO), polybutylene terephthalate (PBT) or polyamides, polyvinylidene fluoride (PVDF), polydimethyl siloxane (PDMS), natural rubber (NR), ethylene propylene rubber (EPM), and ethylene propylene diene monomer rubber (EPDM).

25. The rechargeable battery cell of claim 1, wherein the ion exchange material comprises the sulfonic acid selected from the group consisting of sodium polystyrene sulfonate and poly(2-acrylamido-2-methyl-1-propanesulfonic acid) (polyAMPS).

26. The rechargeable battery cell of claim 1, wherein the ion exchange material comprises a trimethylammonium group.

27. The rechargeable battery cell of claim 1, wherein the ion exchange material comprises polyethylene amine.

* * * * *